(12) United States Patent
Eitzenberger

(10) Patent No.: US 12,234,930 B2
(45) Date of Patent: Feb. 25, 2025

(54) MULTIPART PIPE JOINT

(71) Applicant: PFW AEROSPACE GMBH, Speyer (DE)

(72) Inventor: Berthold Eitzenberger, Ludwigshafen am Rhein (DE)

(73) Assignee: PFW AEROSPACE GMBH, Speyer (DE)

( * ) Notice: Subject to any disclaimer, the term of this patent is extended or adjusted under 35 U.S.C. 154(b) by 0 days.

(21) Appl. No.: 17/782,411

(22) PCT Filed: Dec. 4, 2020

(86) PCT No.: PCT/EP2020/084753
§ 371 (c)(1),
(2) Date: Dec. 8, 2022

(87) PCT Pub. No.: WO2021/110982
PCT Pub. Date: Jun. 10, 2021

(65) Prior Publication Data
US 2023/0013091 A1    Jan. 19, 2023

(30) Foreign Application Priority Data
Dec. 5, 2019   (DE) ..................... 10 2019 008 446.2

(51) Int. Cl.
*F16L 27/08*   (2006.01)
(52) U.S. Cl.
CPC ....... *F16L 27/0861* (2013.01); *F16L 27/0857* (2013.01)

(58) Field of Classification Search
CPC ............... F16L 27/0849; F16L 27/0853; F16L 27/0857; F16L 27/11; F16L 51/025; F16L 27/02; F16L 27/08; F16L 27/04
See application file for complete search history.

(56) References Cited

U.S. PATENT DOCUMENTS

| 2,936,185 A | * | 5/1960 | Olsen | F16L 27/0857 |
| | | | | 285/226 |
| 3,112,129 A | * | 11/1963 | Willis | F16L 27/0857 |
| | | | | 285/226 |
| 3,869,151 A | * | 3/1975 | Fletcher | F16L 27/02 |
| | | | | 285/226 |

(Continued)

FOREIGN PATENT DOCUMENTS

| DE | 931988 C | 8/1955 |
| DE | 1162141 B | 1/1964 |
| KR | 20140014491 A | 2/2014 |

*Primary Examiner* — Zachary T Dragicevich
*Assistant Examiner* — Alexander T Rufrano
(74) *Attorney, Agent, or Firm* — FISHERBROYLES, LLP; Roger L. Browdy; James E. Mrose

(57) ABSTRACT

The invention relates to a multipart pipe joint (10) having a centre piece (16) on which joint parts (18, 20) are received which are pivotable relative thereto and which are rotationally fixed to the centre piece (16) at articulation points (22, 24). The articulation points (22, 24) of the joint parts (18, 20) on the centre piece (16) also represent articulation points (22, 24) for transmission elements (42) which extend axially along an inner wall (34) of the centre piece (16). The articulation points (22, 24) forming articulation axes are arranged in an axial offset (25) to each other. Furthermore, the invention relates to the use of the multipart pipe joint (10) in an aircraft.

17 Claims, 6 Drawing Sheets

(56) References Cited

U.S. PATENT DOCUMENTS

| | | | | |
|---|---|---|---|---|
| 3,915,482 | A | * | 10/1975 | Fletcher .............. F16L 27/0857 285/226 |
| 3,995,896 | A | * | 12/1976 | Decker ............... F16L 27/0853 285/309 |
| 4,508,373 | A | * | 4/1985 | Ward ...................... F16L 27/02 285/288.1 |
| 4,643,463 | A | | 2/1987 | Halling |
| 4,652,025 | A | * | 3/1987 | Conroy, Sr. ......... F16L 27/0857 285/226 |
| 4,746,148 | A | * | 5/1988 | Perkins .................. F16L 27/111 285/226 |
| 5,069,487 | A | * | 12/1991 | Sheppard ............ F01N 13/1811 285/123.1 |
| 6,419,280 | B2 | * | 7/2002 | Uegane ............... F01N 13/1816 285/299 |
| 10,125,907 | B2 | * | 11/2018 | French .................... F16L 25/12 |

* cited by examiner

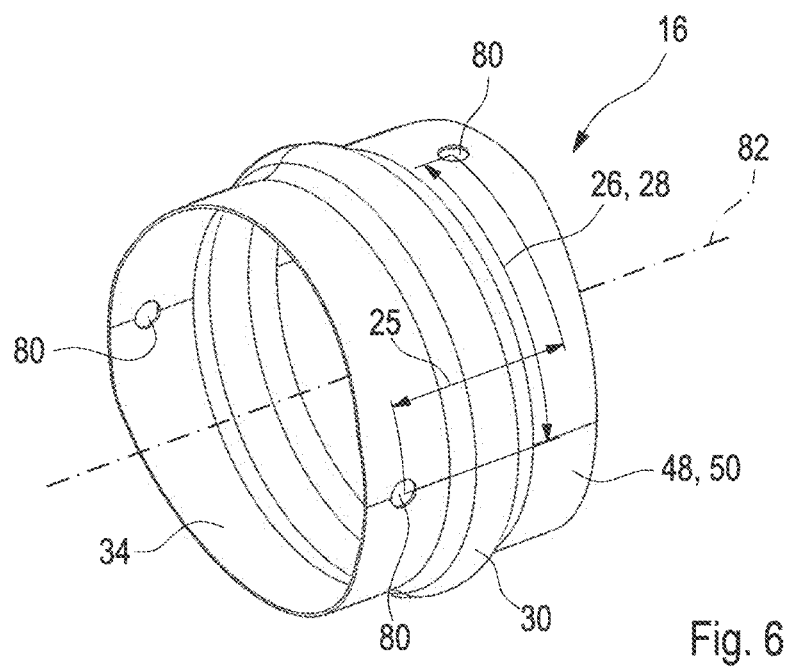
Fig. 6
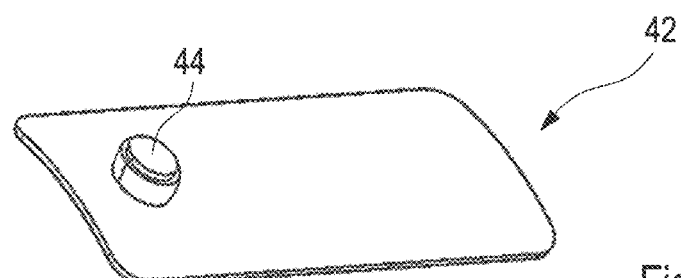
Fig. 6.1
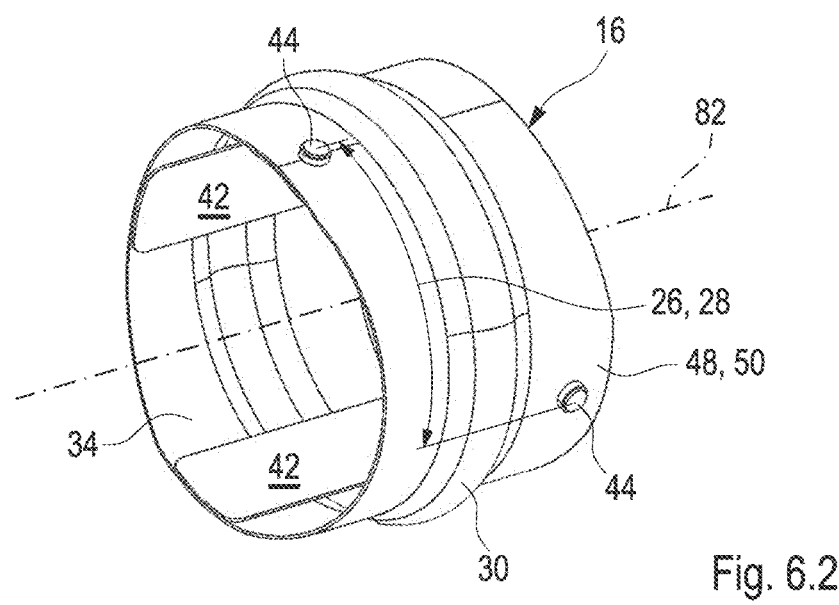
Fig. 6.2

MULTIPART PIPE JOINT

TECHNICAL FIELD

The invention relates to a multipart pipe joint for connecting pipe parts in pipelines, which is in particular installed in an aircraft. Further, the invention relates to the use of the multipart pipe joint in aircraft.

PRIOR ART

DE 847 538 relates to a single or multi-joint pipe connection for thin-walled sheet metal pipes with sealing against internal overpressure. According to this solution, a single or multi-joint pipe connection is proposed which is intended for thin-walled sheet metal pipes with sealing against internal overpressure. According to this solution, the pipe ends are formed as spherical shells. Between the two overlapping spherical surfaces, flexible, elastic and temperature-resistant sealing members are inserted, which are pressed on in a sealing and sliding manner by the catching of the outer spherical surfaces or by adjustable pressure members. The sealing members are designed as rings which are mounted on pressed, forged or cast bodies, the inner diameter of which fits the inner tube, while the outer surface is crowned according to the inner diameter of the outer ball.

DE 22 62 775 03 relates to an articulated pipe connection. This serves to connect a riser pipe to a conveyor pipe extending at an angle thereto, which is a suction conveyor device with a link pipe connected to the conveyor pipe and the riser pipe mounted on a holder pivotable about an axis of rotation. The holder is part of a hinged frame. Swivel bearings connecting the axes of the tube members of the articulated tube run parallel to the axes for rods arranged on the support.

DE 10 2006 029 705 A1 relates to a pipe joint and a pipe joint system comprising such pipe joints. The pipe joint is for connecting a first pipe to a second pipe, wherein a connecting end of the first pipe and a connecting end of the second pipe form a swivel joint. An axis of rotation of the pivot joint and a pipe axis of the first pipe and the second pipe form an angle $\alpha$. The first pipe is rotatable relative to the second pipe from a first angle to a second angle.

Pipe joints used in aircraft piping systems are, for example, in the form of a cardan joint and comprise two axes for angular movement crossing at an angle of 90°. This ensures that the pipe axes always meet at the same point of intersection of the two pipe axes during any angular movement relative to each other in any orientation of the angular movement about the pipe axes. If the pipe is under internal pressure, tensile forces arise that must be transmitted through the cardan joint. Due to the crossing axes for the angular movement, the lines of force flow, according to which the tensile forces run, inevitably run through several 90° deflections. Due to this circumstance, the components of the cardan joint are exposed to a relatively high mechanical load, which means that they have to be built elaborately and heavily. This, in turn, is contrary to the desired requirement for lightweight construction, particularly in aeronautical applications.

DESCRIPTION OF THE INVENTION

The invention is based on the problem of designing a pipe joint of a piping system, in particular in lightweight construction, and constructing it in such a way that it is sealed against an internal pressure prevailing in the piping system in all possible deflection positions of the pipe joint and, on the other hand, force flow lines which occur when the pipe joint is subjected to a tensile load have a mechanically optimised course.

According to the invention, a multipart pipe joint is proposed which has a centre piece on which joint parts adjustable relative to the centre piece are received. These are rotationally fixedly connected to the centre piece at articulation points, whereby the articulation points of the joint parts on the centre piece simultaneously constitute articulation points for transmission elements which extend axially along an inner wall of the centre piece. An axial offset of both pipe axes, i.e. of the centre piece and the joint parts relative to each other, can reduce a force deflection within the centre piece from 90° to 45°.

This reduces the torsional load on the pipe cross-section in the centre piece, which means that the material used and consequently the weight can be reduced. Due to the fact that the articulation points forming the articulation axes opposite each other are designed with an axial offset to each other, less strongly deflected load flow courses can be realised when the internal pipe pressure is applied, and furthermore a resulting lower material stress can be achieved.

Further following the solution proposed according to the invention, the multipart pipe joint is designed in such a way that the articulation points for the transmission elements are arranged in 45° pitch with respect to a circumference of the centre piece. Alternatively, it is possible to arrange the articulation points for the transmission elements with respect to the circumference of the centre piece at a pitch other than the 45° pitch mentioned.

In a continuation of the solution proposed according to the invention, the multipart pipe joint is designed in such a way that in each case a pair of transmission elements arranged offset by 180° with respect to one another are rotationally fixedly connected to the centre piece and the first joint part at the first two articulation points. Furthermore, a further pair of transmission elements arranged offset by 180° to each other is rotationally fixedly connected to the centre piece and the second joint part at the two second articulation points. In a further embodiment of the solution proposed in accordance with the invention, the multipart pipe joint is such that a plurality of units can be combined one behind the other to form a flexible freely movable composite which behaves mechanically in a manner similar to a hose and transfers this property to an originally rigidly formed pipe system.

In an advantageous embodiment of the transmission elements according to the invention, these are substantially tab-shaped and are designed to be pivotable on the inner wall of the centre piece relative thereto.

In an advantageous manner, the multipart pipe joint is such that the joint parts each have a recess on their end faces facing away from the pipe ends. The recesses have the function of preventing a blockage with regard to the angular displacement in the event of a relative movement of the adjustable joint parts with respect to the centre piece.

Advantageously, these recesses are designed as rounded portions which are particularly easy to manufacture.

The multipart pipe joint proposed according to the invention is designed in such a way that the centre piece of the multipart pipe joint has a circumferential crease formed centrally in the material to form a pipe wall.

Depending on the angle between the plane spanned by the pipe axes and the planes in which the articulation axes lie, the bellows can be deformed at two axial positions at an angle of 90° with different deflections. The crease supports the bellows in a wear-reducing manner over the large radius of the crease when the angular position of the pipe axes changes dynamically, thus avoiding wear-causing contact of the bellows with the protruding elements of the articulation axes. The crease thus assumes a guide function. In addition, the cross-section of the centre piece is twisted due to the internal pipe pressure, which loads the multipart pipe joint with tensile forces. The distance between the articulation axes reduces the tensile forces, as the force flow in the cross-section of the centre piece no longer has to be deflected by 90°, but is only deflected by 45°. The crease in combination with the inner plates, i.e. the transmission elements, opposes the torsion as a closed cross-section at the four positions of the load application via the articulation axes. Thus, the crease also has a load-bearing function.

In a continuation of the solution proposed according to the invention, the joint parts of the multipart pipe joint are designed in such a way that they each have a diameter increase on their end faces facing the pipe ends, which constitute mounting surfaces for receiving a bellows covering the multipart pipe joint. The function of the bellows is to provide a seal against internal pressure. The bellows is pressure-stable due to its design with a crease, but is movable enough to follow any angle of the multipart pipe joint.

In the multipart pipe joint proposed according to the invention, the first joint part can be pivoted in relation to the centre piece about the first articulation points arranged at an offset of 180° to each other. Furthermore, the second joint part can be pivoted with respect to the centre piece about the second articulation points arranged at an offset of 180° with respect to each other. In a preferred embodiment of the multipart pipe joint, a minimum gap width, viewed in the axial direction, between the end face of the first pipe end and an end face of the centre piece opposite thereto is 3 mm, preferably 1 mm. A minimum gap width in the radial direction between the first joint part and an outer wall of the centre piece is less than 1.5 mm, preferably a few tenths of a millimetre, particularly preferably 0.2 mm.

In an advantageous further development of the multipart pipe joint proposed according to the invention, a ring is arranged in the region of the articulation points of the transmission element between an outer wall of the centre piece and an inner wall of the first and second joint parts which are movable relative to the centre piece. This ring—or alternatively disc—ensures a distance between the moving pipe ends and the centre piece, which makes it possible for these components to move in relation to each other. Without the minimum distance defined by the ring or the disc, these components would touch and rub against each other in the angular position or deformation would occur. If the disc or ring is made of a flexible material such as PTFE, it is inserted during assembly and automatically adapts to the curvature of the pipe diameter and serves to reduce wear.

If, on the other hand, the ring or the disc is made of a metallic material, it is adapted to the curvature of the pipe ends and is connected to the pipe ends by a material bond, e.g. welded, before assembly and thus additionally reduces the hole friction and the surface pressures in the area of the articulation axes as a reinforcing element. These two construction methods can also be used in combination for the ring or the disc.

The invention further relates to the use of the multipart pipe joint in an aircraft for starting at least one engine and for heating or ventilating the passenger cabin. In the present context, such an aircraft configuration is to be understood as a bleed air system which conveys compressed and thereby warmer air from the turbine compressor of jet engines on the wings to the aircraft's air conditioning system in the fuselage. It is also possible to use the bleed-air system to direct hot exhaust gases from an auxiliary power unit, such as that located in the rear of a passenger aircraft, to the aircraft's engines and start them one after the other. The bleed air system thus connects the propulsion turbines in the wings with the auxiliary power unit in the rear of the aircraft and the air conditioning system in the fuselage of the aircraft. The structure of the aircraft at the transition from the fuselage to the wing is subject to strong elastic deformations, which the normally installed pipes in the bleed-air system cannot withstand. Therefore, the multipart pipe joints proposed according to the invention are used especially at these positions.

Advantages of the Invention

Due to the axial offset of the two pipe axes by two pivot points, the force redirection within the centre piece can be reduced from 90° to 45°. This reduces the torsional load on the pipe cross-section of the centre piece, which also allows its weight to be reduced during design. This represents a decisive difference between prior art solutions in terms of weight savings for aircraft and offers an advantage over previous prior art embodiments.

If, in the multipart pipe joint proposed according to the invention, both pipe ends are deflected by, for example, 7° in relation to the centre piece, this results in a maximum axial offset of the pipe ends of 7.3 mm at an angle of 45° in each case between the plane of the two pipe axes, which are at a maximum angle of 10° to each other, and the articulation axes. The solution proposed according to the invention can be influenced in the case of axial offset via a predetermined rotational position in the pipe system corresponding to the expected deflection planes of the multipart pipe joint in later operation. Due to the axial offset of the two pipe axes, the force deflection within the centre piece can be reduced from 90° to 45°. This reduces the torsional load on the annular pipe cross-section in the centre piece, thus the material used can be reduced and thus the weight of the multipart pipe joint proposed according to the invention can also be reduced. With regard to aeronautical applications, this represents an advantageous difference to previously used designs that have a higher weight. If, for example, the two joint parts hinged to the centre piece are provided with recesses at their ends facing the centre piece, which are preferably designed as rounded portion, a greater deflection of the two joint parts hinged to the centre piece can be achieved, which results in a greater degree of freedom with regard to the installation of the pipe joint proposed according to the invention in adaptation to confined installation space conditions. Furthermore, if the centre piece is provided with a circumferential crease formed in its pipe wall, a bellows surrounding the multipart pipe joint, in particular a bellows, can be flexibly deformed during deflection movements of the components of the multipart pipe joint. The circumferential crease provides wear-reducing support for the bellows over the relatively large radius of the crease in the event of dynamic changes in the angular position of the pipe axes and thus reduces wear-causing contact between the bellows and protruding elements of the articulation axes at the articulation points. This crease thus has a guide function in an advantageous manner. If the cross-section of the centre piece is subjected to torsional movement, for example due to internal pipe pressure, the multipart pipe joint is subjected to tensile forces. The distance of the articulation axes from each other significantly reduces this, as the flow of forces in the cross-section of the centre piece no longer has to be deflected by 90°, but only by 45°. The multipart pipe joint proposed according to the invention is further characterised in an advantageous manner by the fact that rings made of metal or alternatively a disc made of PTFE can be installed as a spacer ring to reduce friction and reinforce the articulation points. This creates a distance between the outer wall of the centre piece and the inner wall of the adjustable joint parts, so that a movement causing friction is prevented, but the movement can be permitted as such.

The spacing between the articulation axes proposed according to the invention has the further advantage that the associated axial expansion of each cardan joint, which combines a few pipe joints directly one behind the other to form a system, creates a flexible freely movable assembly that behaves mechanically in a similar way to a hose. Its flexible properties are transferred to an originally rigidly designed pipe system. However, in order to achieve the same axial length with the multipart pipe joint proposed according to the invention as with cardan joints of the previously usual design, fewer joints are required, each of which is also lighter than cardan joints of the previously usual design. Both result in a reduction of the system weight when using the design proposed according to the invention compared to cardan joints of the previously usual design.

The maximum angular position of the pipe axes in relation to each other can be increased by the solution proposed according to the invention, since a longer bellows is more flexible and has better fatigue strength properties. The number of alternating loads to be achieved at maximum deflection angle is predetermined for each system in aeronautical applications. Due to the larger deflection angle, a possible number of alternating loads would decrease. However, due to the greater flexibility of a longer bellows with more creases and thus a lower load per crease at maximum deflection of the pipe axes in relation to each other, the reduction in a possible number of alternating loads would be compensated for and the values specified for each system in aviation applications would be achieved and exceeded.

With the solution proposed according to the invention, an overall lower weight can be achieved. With an axial offset of the articulation points forming the articulation axes, less strongly deflected load flow courses can be achieved in the gimbal ring when an internal pipe pressure is applied and a considerably reduced material stress resulting therefrom.

A further advantage of the solution proposed in accordance with the invention is that, due to the longer construction, the axially offset articulation axes formed by the articulation points enable a higher number of load changes of the longer bellows with a simultaneously possible larger maximum deflection angle of the pipe axes relative to each other.

The solution proposed according to the invention also has the advantage that several multipart pipe joints of the design proposed according to the invention can be coupled directly one behind the other, so that a weight-reduced pipe system with a hose-like mobility is achieved, compared to the rather rigid pipe systems of previous design, which only permit small deflection angles.

BRIEF DESCRIPTION OF THE DRAWING

With reference to the drawing, the invention is described in more detail below. It is shown.

EMBODIMENT VARIANTS

Figure 1:
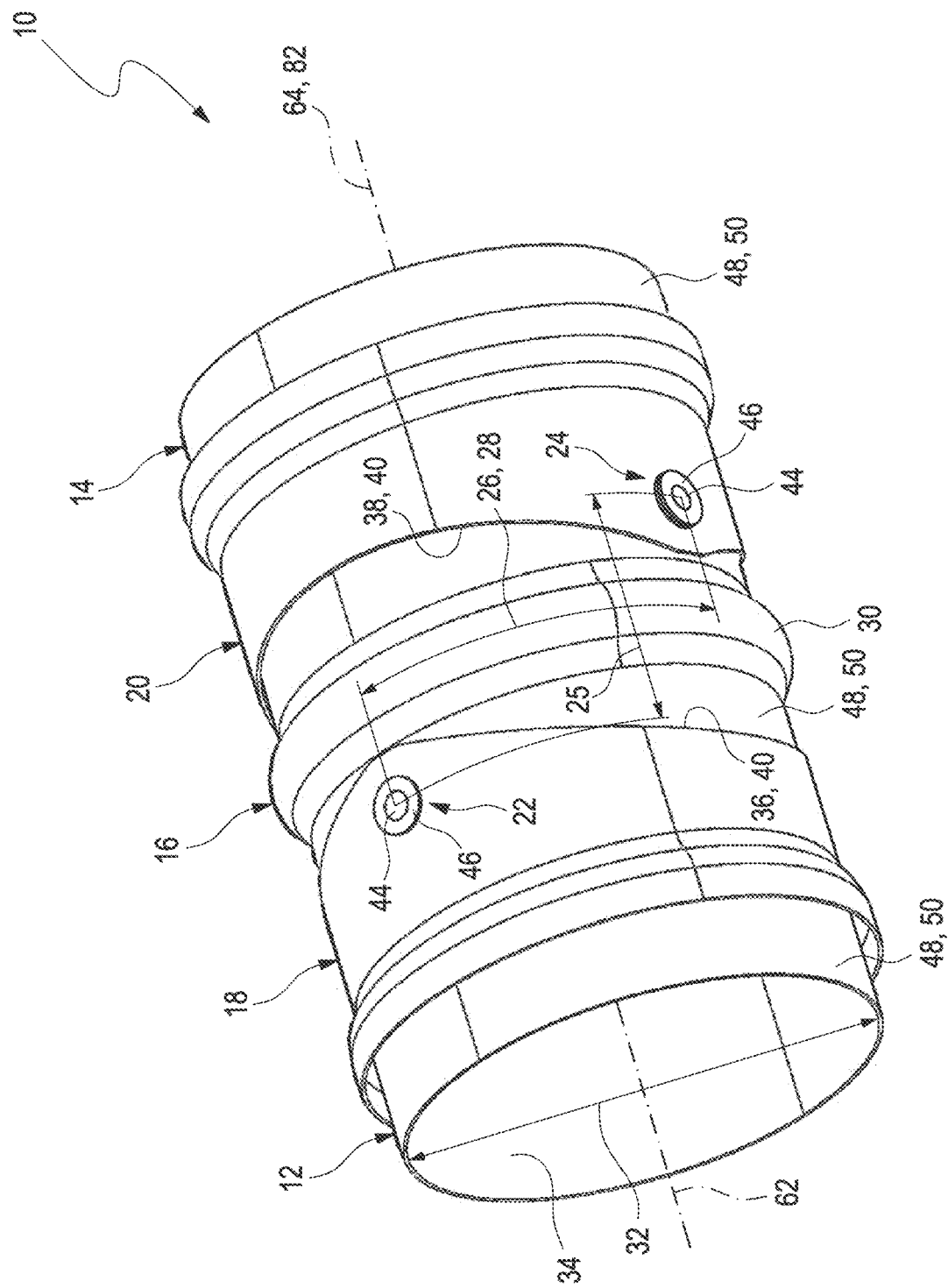
FIG. 1 a perspective view of the multipart pipe joint proposed according to the invention in an elongated embodiment, FIG. 2 a longitudinal section through the multipart pipe joint proposed according to the invention in the extended position as shown in perspective in FIG. 1, FIG. 3 the multipart pipe joint proposed according to the invention in a first deflected position, FIG. 4 the multipart pipe joint proposed according to the invention in a second version in a second position, FIG. 5 a longitudinal section through the multipart pipe joint in the second deflected position according to FIG. 4, FIG. 6 a drawing of an individual part of a swivelling joint part with articulation points offset by 45° to each other, FIG. 6.1 a perspective view of a transmission element in the form of a bottle, and FIG. 6.2 an assembly drawing of the swivelling joint part with transmission elements in the form of tabs mounted on it.

FIG. 1 shows the multipart pipe joint 10 according to the invention in a perspective view in an extended position.

A multipart pipe joint 10 shown in the perspective view according to FIG. 1 comprises a centre piece 16. A first joint part 18 and a second joint part 20 are movably received on the centre piece 16. The first joint part 18 terminates in a first pipe end 12, while the second joint part 20 terminates in the second pipe end 14. The first joint part 18 is movably attached to the centre piece 16 at first articulation points 22, which form a joint axis. A further first articulation point 22 is located opposite the first articulation point 22 shown in FIG. 1, offset by 180°, and is not shown in FIG. 1.

The second joint part 20 is hinged to the centre piece 16 at second articulation points 24, which form a further joint axis, and ends in the second pipe end 14. Opposite the second articulation point 24, which is shown in FIG. 1, is a further second articulation point 24, which is not shown in FIG. 1 and is offset by 180° from the first.

The perspective view according to FIG. 1 shows that an offset 26 is formed between the first articulation point 22 and the second articulation point 24, which in this embodiment is substantially 45°. Instead of the offset 26 shown in FIG. 1, which is 45°, another angle can also be selected as offset angle 28.

A circumferential crease 30 is located centrally on the centre piece 16 in its pipe wall. Reference sign 32 designates the pipe cross-section, which is bounded by an inner wall 34 of the centre piece 16, the first joint part 18 and the second joint part 20.

The pivotable joint parts 18, 20 arranged on both sides of the circumferential crease 30 formed centrally in the wall of the centre piece 16 each have a first recess 36 and a second recess 38 on their side facing the circumferential crease 30. Advantageously, the first recess 36 and the second recess 38 are rounded portions 40.

Figure 2:
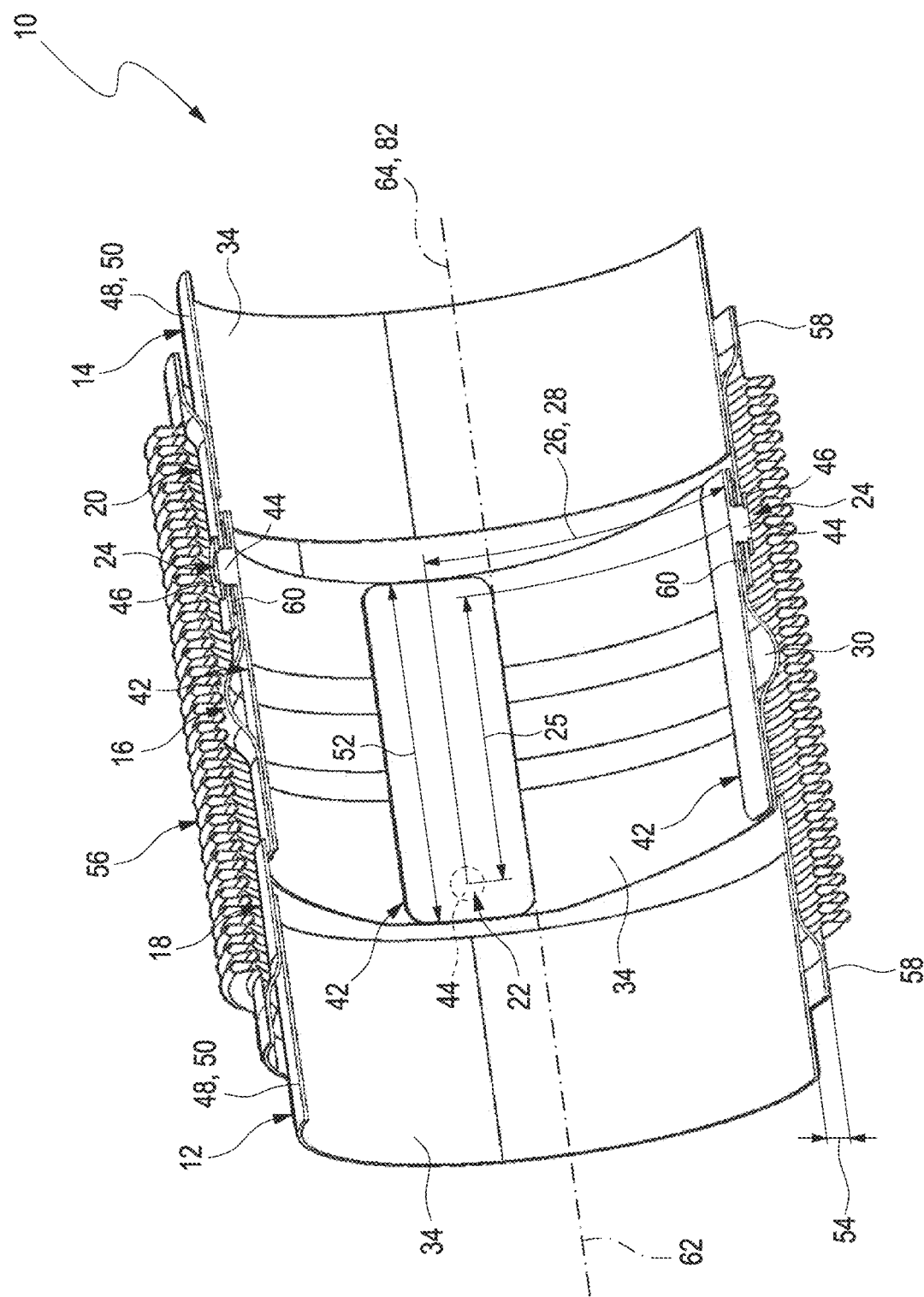

FIG. 2 shows a longitudinal section through the multipart pipe joint 10 proposed in accordance with the invention, shown in its stretched position in FIG. 1.

FIG. 2 shows that tab-shaped transmission elements 42 run along the inner wall 34. These are arranged at first articulation points 22 and at second articulation points 24 on the inside of the inner wall 34 of the centre piece 16. The tab-shaped transmission elements 42 are pivotably mounted on cams 44, the cams 44 being parts of the first articulation points 22 and the second articulation points 24 respectively.

As already mentioned in connection with FIG. 1, the first articulation points 22 and the second articulation points 24 are offset from each other by the offset angle 28 of, for example, 45°. FIG. 2 further shows that the multipart pipe joint 10 is enclosed by a bellows 56, which is shown here in sectional view. The bellows 56 has shoulders at each of its ends, which are executed in a diameter increase 54. The diameter increase 54 refers to the distance between the outer wall 48 of a circumference 50 and the inner side of the bellows 56, which is preferably designed as a bellows. In the centre, the bellows 56 is supported by the circumferential crease 30 formed centrally in the wall of the centre piece 16. In the sectional view according to FIG. 2, it is shown that the transmission element 42 extends in its longitudinal extension 52 parallel to the inner wall 34 of the centre piece 16. The longitudinal extension 52 of the transmission elements 42 corresponds to the length of the centre piece 16. The edges thereof adjoin the inner sides of the first joint part 18 and the second joint part 20, respectively, before they are joined by the first pipe ends 12 and the second pipe ends 14, respectively.

The circumferential crease 30 formed in the wall of the centre piece 16 supports the bellows 56 over its large radius in a wear-reducing manner when the angular position of the joint parts 18, 20 changes dynamically and thus avoids wear-generating contact of the bellows 56 with protruding elements of the articulation axes, in particular a disc 46 on the outside of the first and second joint parts 18, 20. The circumferential crease 30 thus has a guide function. Furthermore, it should be noted that the pipe cross-section 32 of the centre piece 16 is twisted due to an internal pipe pressure prevailing therein, so that the multipart pipe joint 10 is loaded with tensile forces. Due to the distance between the articulation axes, which are formed by the first articulation points 22 and the two second articulation points 24, the tensile forces are significantly reduced, as the force flow in the cross-section of the centre piece 16 no longer has to be deflected by 90°, but only by 45°. The torsional stress is thus counteracted by the circumferential crease 30 in conjunction with the inner plates, i.e. the transmission elements 42 as a closed cross-section at the four positions of load application, i.e. at the first two articulation points 22 and the second two articulation points 24 via the articulation axes. The circumferential crease 30 thus assumes a load-bearing function.

The offset angle 28 of the offset 26 shown in FIG. 2 is 45°. This offset 26 is only shown as an example. Instead of the offset 26 of 45° shown in FIG. 2, other angles are also possible. Furthermore, it can be seen from the sectional view according to FIG. 2 that a ring 60 is accommodated on the cams 44—here, for example, at the two opposing second articulation points 24—next to the disc 46. The ring 60 ensures a distance between the moving joint parts 18, 20 and the stationary centre piece 16, whereby a mobility of these components is only made possible by the distance. Without the ring 60 and the minimum distance defined by it, the pivoting joint parts 18, 20 would contact each other and rub or even deform in angular position. The ring 60 can also be made of a flexible material such as PTFE, be inserted during assembly and thereby adapt to the curvature of the pipe diameter by itself and serve to inhibit wear. If, on the other hand, the ring 60 is made of metal, it is adapted to the curvature of the pivoting joint parts 18, 20 and welded before assembly and thus, as an additional reinforcing element, reduces the surface pressures in the area of the articulation axes of the first articulation points 22 and the second articulation points 24, respectively, which are opposite each other and offset by 180°.

Figure 3:
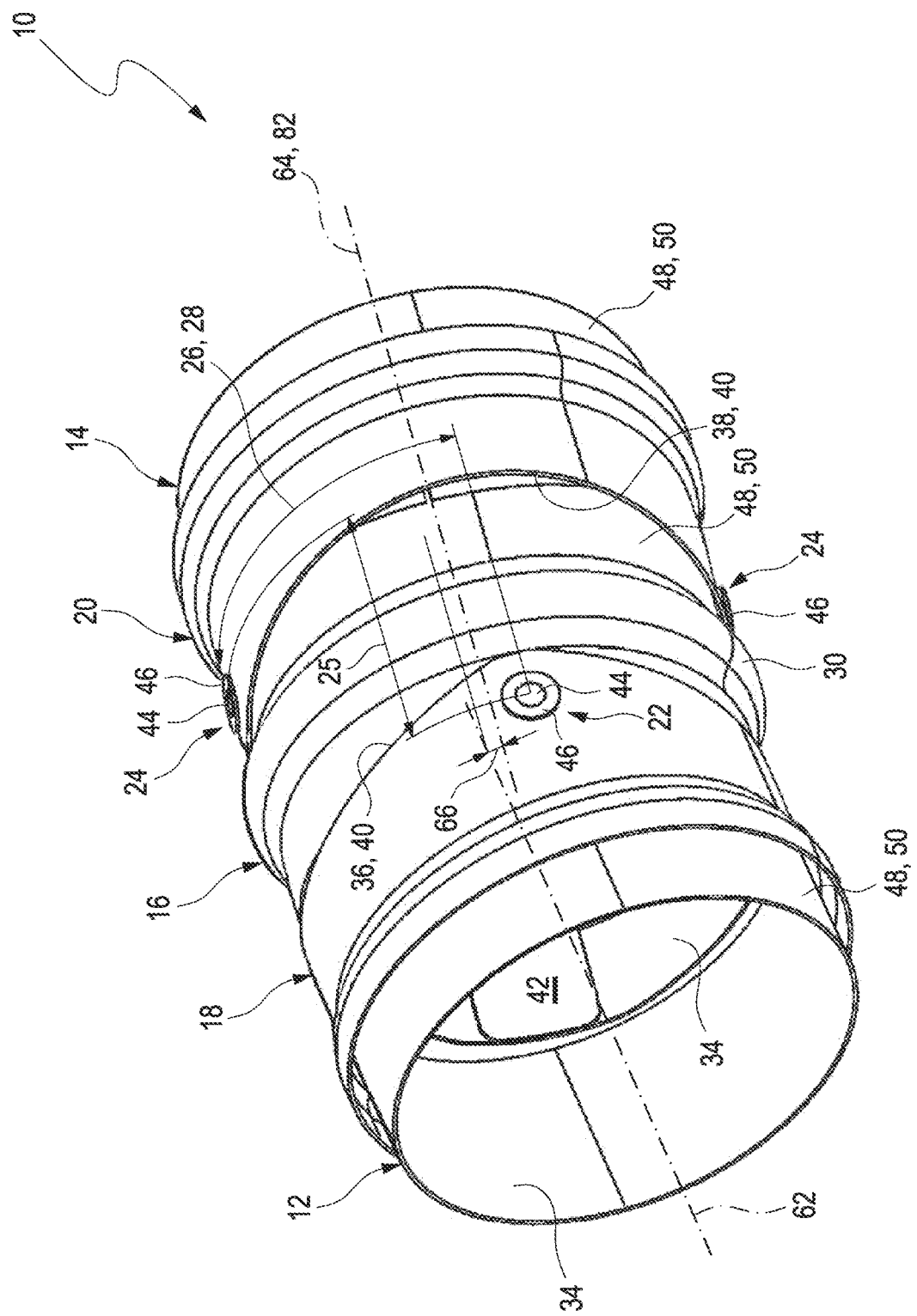

The perspective view according to FIG. 3 shows a first deflection situation of the multipart pipe joint 10.

FIG. 3 shows that in this perspective view a centre axis 62 of the first joint part 18 has an axial offset 66 relative to a centre axis 64 of the second joint part 20. In the representation according to FIG. 3, the axial offset 66 is approx. 7 mm, whereby the two joint parts 18, 20 are pivoted by 7° with respect to the centre piece 16, at an angle of 45° in each case between the plane of the two centre axes 62 and 64, respectively, which are at a maximum angle 70 of 10° to one another, and the articulation axes which are given by the two first articulation points 22 and the two second articulation points 24. In the illustration according to FIG. 4, this axis offset 66 is reduced to 0 mm as soon as the plane of the pipe axes coincides with one of the articulation axes, i.e. either the axis running through the first two articulation points 22 or through the second two articulation points 24. (Illustration in FIG. 4)

The axis offset 66 can be influenced by a predetermined rotational position in the pipe system corresponding to the expected deflection planes of the multipart pipe joint 10 under operating conditions. If this rotational position, i.e. the installation position, is not deliberately specified, the illustration according to FIG. 3 describes the maximum possible axial offset 66 of the two pipe ends 12, 14 of the two joint parts 18, 20. The multipart pipe joint 10 must be designed to be able to compensate for the maximum possible axial offset 66.

The axial offset 66 between the centre axis 62 and the centre axis 64 is 7.3 mm in the representation according to FIG. 3. The perspective view according to FIG. 3 also shows that the visible first and second articulation points 22, 24 are arranged at an offset angle 28, which has an offset amount of 45°. The opposite articulation points to those of the two articulation points 22, 24 shown are offset by 180° from the first and second articulation points 22, 24 shown and are therefore not shown.

While the first joint part 18 can be moved around the two first articulation points 22 which are offset by 180° to each other, as shown in FIG. 3, the second joint part 20 moves around the two second articulation points 24 which are opposite each other by 180° in the illustration according to FIG. 3. This means that the respective planes of movement of the two joint parts 18 and 20 are oriented offset from each other by 45°. Instead of an offset value of 45°—as shown in FIG. 3—another offset 26 could also be selected, for example 30°, 40°, 50° or even 60°. In all cases, the multipart pipe joint 10 proposed according to the invention is associated with a considerable reduction in the mechanical loads on the components of the multipart pipe joint 10.

For the sake of completeness, it should be mentioned that in the perspective view according to FIG. 3, which shows the multipart pipe joint 10 in a first deflected position, the tabs representing the transmission elements 42 extend parallel to the inner wall 34 of the centre piece 16 of the multipart pipe joint 10. The transmission elements 42 are attached by the cams 44 to each of the first articulation points 22 and each of the second articulation points 24, respectively, and are arranged to pivot relative to the inner wall 34.

Figure 4:
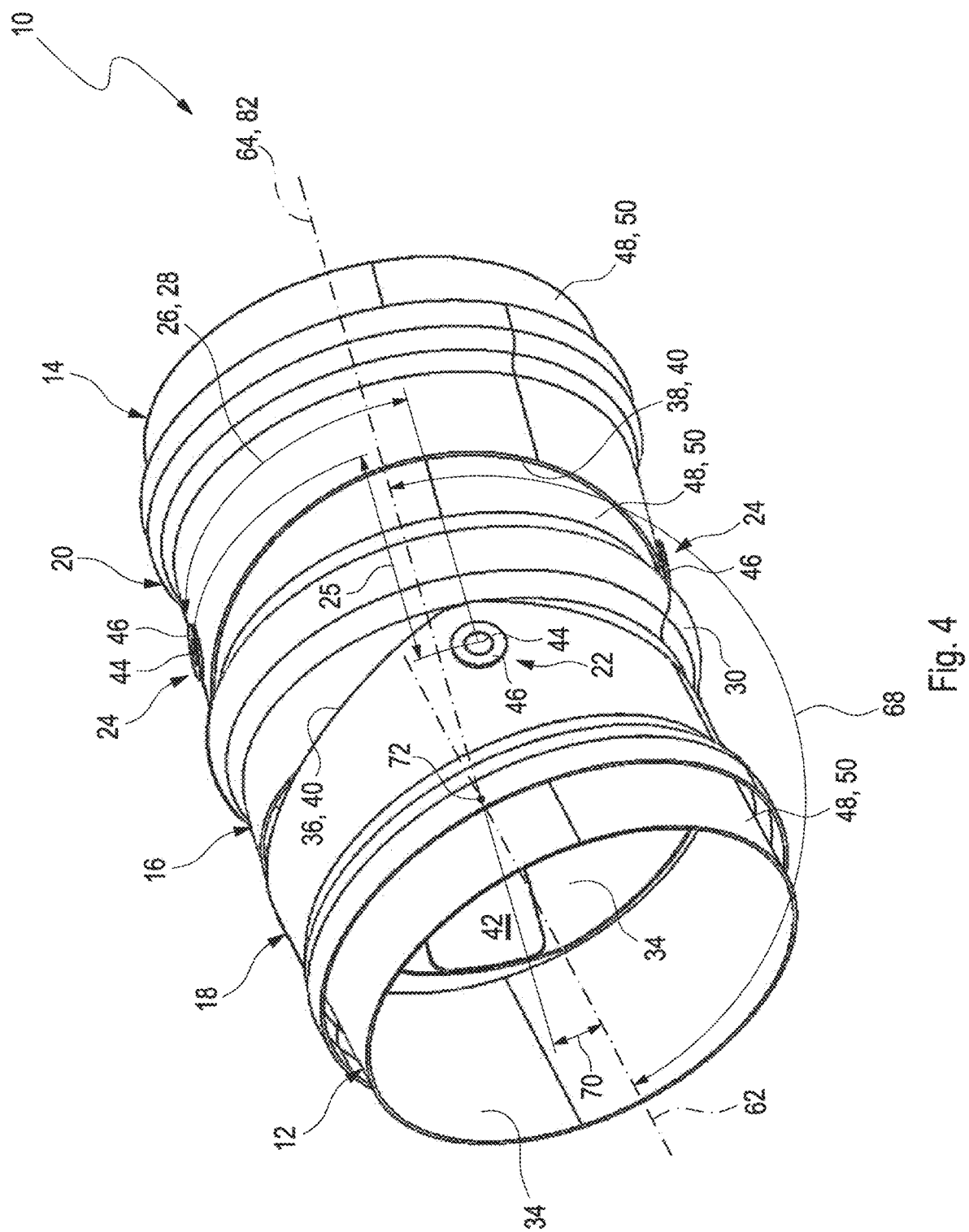

FIG. 4 shows a second deflection position of the multipart pipe joint 10.

It can be seen from the illustration in FIG. 4 that in the second deflection position of the components of the multipart pipe joint 10 shown there, a 170° angle is enclosed between the centre axis 62 of the first joint part 18 and the centre axis 64 of the second joint part 20, cf. reference sign 68. The distance 72 of the centre axes 62, 64 is 0 mm, the angle 70 is 10°. Analogous to the illustration according to FIG. 3, which shows the first deflection position of the components of the multipart pipe joint 10, the bellows 56 is also omitted in the illustration according to FIG. 4 for reasons of representability.

Figure 5:
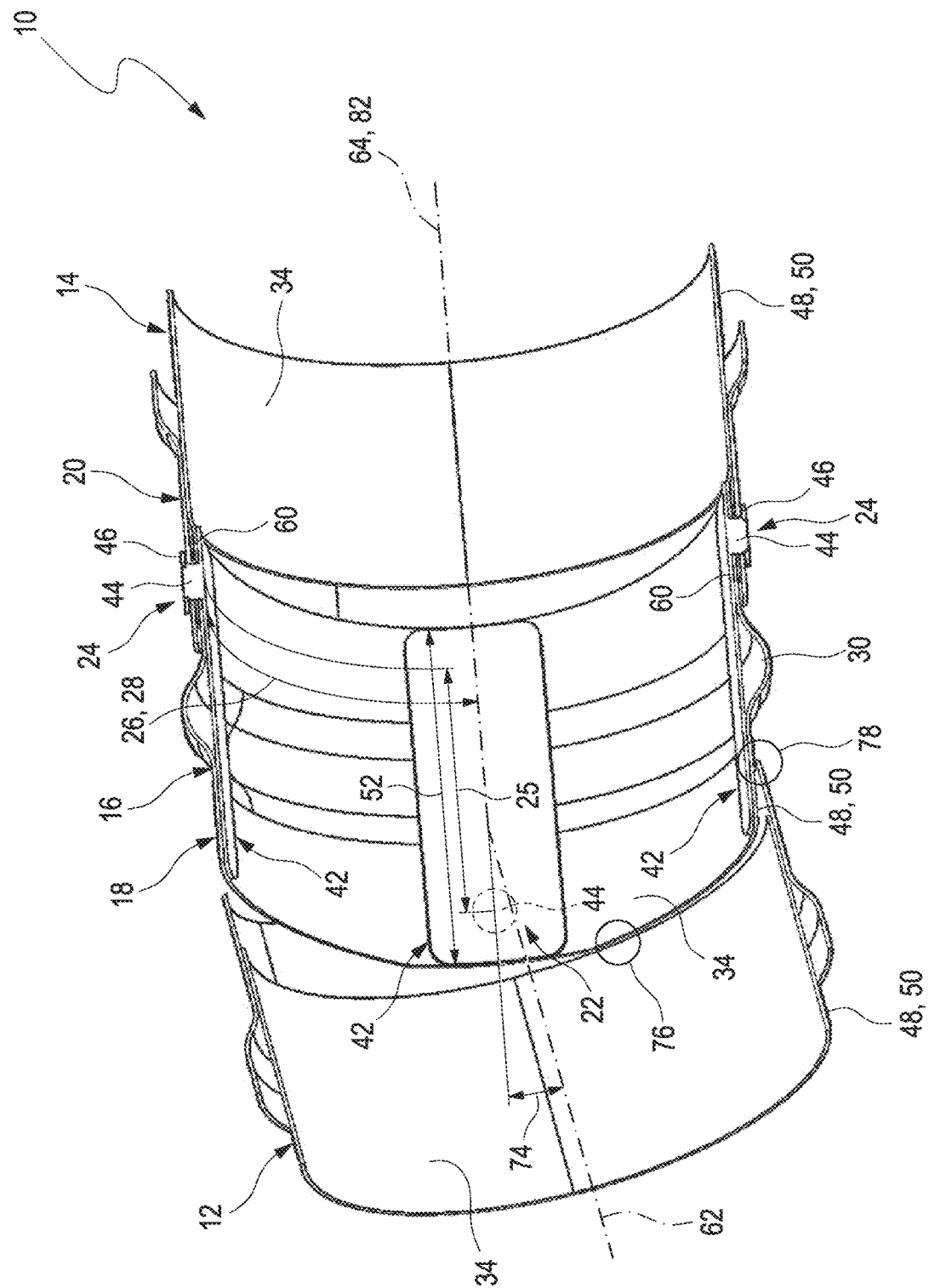

The illustration according to FIG. 5 shows a further section through the multipart pipe joint 10 proposed according to the invention, the deflection position of which according to FIG. 5 is identical to that in FIG. 4.

FIG. 5 shows that the centre piece 16 has the circumferential crease 30 in its lateral surface, which comprises an inner wall 34. The second joint part 20 is accommodated in the two second articulation points 24 shown in the sectional view according to FIG. 5, which are offset by 180° from one another and are in a stretched, i.e. not angled, position in relation to the centre piece 16 with respect to the centre axis 82 of the centre piece 16. As FIG. 5 shows, cams 44 are formed on the tab-shaped transmission elements 42 at the two opposing second articulation points 24. On the one hand, a ring 60 for reducing friction is accommodated in the cams 44, and on the outside of each of the cams 44 is the disc 46. The tab-shaped transmission elements 42 are designed in the longitudinal extension 52.

In contrast to the undeflected position of the second joint part 20 with respect to the centre piece 16, the first joint part 18 is in an angled position with respect to the centre piece 16. This is evident from an angle denoting a 10° offset 74 between the centre axis 82 of the centre piece 16 and the centre axis 62 of the first joint part 18. The offset 74 shown in FIG. 5 is 10°. The angled position of the first joint part 18 in relation to the centre piece 16 shown in the sectional view according to FIG. 5 results in a gap width 1, compare position 76, which is 1 mm and which occurs in the deflected position of the first joint part 18 shown in FIG. 5 between the two opposite end faces of the centre piece 16 on the one hand and the deflected first joint part 18 on the other hand. Furthermore, a gap width 2 in the order of a few tenths of a millimetre, preferably 0.2 mm, compare position 78, is established between the outer surface of the first joint part 18 and the outer wall 48 of the centre piece 16. The gap widths 1 and 2 shown in FIG. 5, compare positions 76 and 78, occur when the first joint part 18 is deflected in relation to the stationary centre piece 16, in particular with a maximum permissible angular compensation.

When the pipe axes of the two joint parts 18, 20 are deflected at an angle to each other, they define a plane. The articulation axes, which are formed by the opposing articulation points 22, 24 and which are rotated through 90° to each other, have an angle of rotation to this plane. There are two extreme positions of rotation of 45°/45° and 0°/90° of the two articulation axes in relation to the plane of the pipe axis and every angle in between. A rotation of 0°/90° results in an axial offset of the pipe axes of 0.0 mm with a maximum angular position 70 of 10° of the pipe axes to each other. At the extreme position of 45°/45°, the axial offset of the pipe axes is 7.3 mm with a maximum angular position 70 of 10° of the pipe axes to each other.

FIGS. 6, 6.1 and 6.2 show the manufacturing and assembly steps of the centre piece 16 of the multipart pipe joint 10 proposed according to the invention.

FIG. 6 shows the centre piece 16, on the circumference 50 of which bores 80 are formed opposite one another, which have the receptacles, for example, for the cams 44 of the tab-shaped transmission elements 42. The bores 80 with the cams 44 of the tab-shaped transmission elements 42 received therein represent the two first articulation points 22 opposite each other offset by 180°. On the other side of the circumferential crease 30 running centrally in the centre piece 16 are in an analogous manner offset 26, which can be executed at an offset angle 28 of, for example, 45°. Alternatively, other offset angles 28 can be selected, such as 30°, 40°, 50° or 60°, in order to optimise the force flow lines. In the scheme shown in FIG. 6, the holes 80 are made in the outer wall 48 of the tubular centre piece 16. FIG. 6.1 shows a perspective view of the transmission element 42 which, in its fitted position, fits snugly against the inner wall 34 of the centre piece 16. This comprises the cams 44 at one end, which are fitted into the bore 80 and are secured by the disc 46.

FIG. 6.2 shows the transmission element 42, the cams 44 of which are pressed into the bores 80 of the centre piece 16. FIG. 6.2 corresponds to the illustration in FIG. 6, according to which the individual bores 80 for receiving the cams 44 of the tab-shaped transmission elements 42 are offset in relation to each other and the offset 26 at the offset angle 28. An articulation axis is formed by the two opposing first articulation points 22; a further articulation axis is formed by the two opposing second articulation points 24. Analogous to the illustration in FIG. 6, the centre piece 16, the circumferential crease 30, extends centrally in the outer wall 48 and serves to support the bellows 56 shown in section in FIG. 2.

The invention is not limited to the embodiments described herein and the aspects highlighted therein. Rather, within the scope indicated by the claims, a variety of variations are possible which are within the scope of skill in the art.

LIST OF REFERENCE SIGNS 10 multipart pipe joint
12 first pipe end
14 second pipe end
16 centre piece
18 first joint part
20 second joint part
22 first articulation point
24 second articulation point
25 axial offset
26 offset (45°)
28 offset angle
30 circumferential crease
32 pipe cross-section
34 inner wall
36 first recess
38 second recess
40 rounded portion
42 transmission element
44 cam
46 disc
48 outer wall
50 circumference
52 longitudinal extension transmission element
54 diameter increase
56 bellows
60 ring
62 central axis of first joint part
64 central axis second joint part
66 offset of centre axes
68 170° angle
70 10° angle
72 0-distance
74 10° offset
76 gap width 1 (1.0 mm)
78 gap width 2 (0.2 mm)
80 bore for cam
82 centre axis centre piece

The invention claimed is:

1. A multi-part pipe joint comprising:
   a centre piece
   a first joint part and a second joint part received on said centre piece, said joint parts being adjustable relative to the centre piece and being rotationally fixedly connected to the centre piece at articulation points, and
   a plurality of transmission elements respectively between the centre piece and the first joint part and between the centre piece and the second joint part,
   wherein the transmission elements are mounted at the articulation points, said transmission elements extending axially from a first end of an inner wall of the centre piece to a second end of the inner wall of the centre piece, the articulation points forming articulation axes being arranged in an axial offset (25) relative to one another.

2. A multi-part pipe joint according to claim 1, wherein the articulation points are arranged offset from one another by an offset angle with respect to a circumference of the centre piece.

3. A multi-part pipe joint according to claim 2, wherein in each case a first pair of the transmission elements arranged offset by 180° relative to one another are rotationally fixedly connected to the centre piece and the first joint part at a first pair of the articulation points.

4. A multi-part pipe joint according to claim 3, wherein in each case a second pair of the transmission elements arranged offset by 180° relative to one another are rotationally fixedly connected to the centre piece and the second joint part at a second pair of articulation points of the articulations points.

5. A multi-part pipe joint according to claim 2, wherein the transmission elements are tab-shaped and pivotable on the inner wall of the centre piece.

6. A multi-part pipe joint according to claim 1, wherein the joint parts, comprising pipe ends, each have a recess on their end faces facing away from the pipe ends.

7. A multi-part pipe joint according to claim 6, wherein the recesses are each designed as a rounded portion.

8. A multi-part pipe joint according to claim 1, wherein the centre piece has a circumferential crease formed centrally in its pipe wall, which performs a wear-reducing guide function with respect to a bellows and a load-bearing function with respect to torsion of the centre piece.

9. A multi-part pipe joint according to claim 1, wherein the joint parts, comprising pipe ends, each have a diameter increase on their end faces facing the pipe ends, which respectively constitute mounting surfaces for receiving a bellows covering the multi-part pipe joint.

10. A multi-part pipe joint according to claim 3, wherein the first joint part is pivotable with respect to the centre piece and the first pair of articulation points arranged at an offset of 180° to one another.

11. A multi-part pipe joint according to claim 4, wherein the second joint part is pivotable with respect to the centre piece about the second pair of articulation points arranged in a 180° offset.

12. A multi-part pipe joint according to claim 1, wherein, with maximum permissible angular compensation, a first minimum gap width in the axial direction between an end face of the first joint part and an end face of the centre piece opposite thereto is 3 mm.

13. A multi-part pipe joint according to claim 1, wherein, with maximum permissible angular compensation, a second minimum gap width in the radial direction between the first joint part and an outer wall of the centre piece is less than 1.5 mm.

14. A multi-part pipe joint according to claim 1, wherein in a region of the articulation points of the transmission element between an outer wall of the centre piece and an inner wall of the first and second joint parts there is arranged a ring which brings about a spacing between the centre piece and the joint parts and serves as a reinforcing element with respect to surface pressures in the region of the articulation points.

15. An air supply system for aircraft comprising a multi-part pipe joint, according to claim 1.

16. A multi-part pipe joint according to claim 1, wherein, with maximum permissible angular compensation, a first minimum gap width in the axial direction between an end face of the first pipe end and an end face of the centre piece opposite thereto is 1 mm.

17. A multi-part pipe joint according to claim 1, wherein, with maximum permissible angular compensation, a second minimum gap width in the radial direction between the first joint part and an outer wall of the centre piece is 0.2 mm.

* * * * *